United States Patent
Hemingway et al.

(10) Patent No.: US 7,950,711 B2
(45) Date of Patent: May 31, 2011

(54) BODY MOUNT

(75) Inventors: Todd Hemingway, Metamora, MI (US); Michael Danby, Stoney Creek (CA); Jason Reznar, Redford, MI (US); Michael Vanderzwaag, Hamilton (CA)

(73) Assignee: A. Raymond et Cie, Grenoble (FR)

( * ) Notice: Subject to any disclaimer, the term of this patent is extended or adjusted under 35 U.S.C. 154(b) by 0 days.

(21) Appl. No.: 12/322,024

(22) Filed: Jan. 28, 2009

(65) Prior Publication Data

US 2010/0001542 A1   Jan. 7, 2010

Related U.S. Application Data

(60) Provisional application No. 61/062,589, filed on Jan. 28, 2008.

(51) Int. Cl.
*B62D 24/04* (2006.01)

(52) U.S. Cl. .................................. 296/35.1; 411/511

(58) Field of Classification Search ............... 296/35.1; 411/511, 513, 520, 521
See application file for complete search history.

(56) References Cited

U.S. PATENT DOCUMENTS

| 4,801,230 A | 1/1989 | Wilburn |
| 6,209,929 B1 | 4/2001 | Ikegami et al. |

OTHER PUBLICATIONS

Int'l Search Report, Mar. 16, 2009, Tinnerman Palnut Engineer.

*Primary Examiner* — Lori L Lyjak
(74) *Attorney, Agent, or Firm* — McDonald Hopkins LLC (57) ABSTRACT

A body mount included at least one clip, at least one plate and a sleeve. The clip may include a generally cylindrical body having a central aperture therethrough. The clip may further include at least one set of inwardly extending prongs. The clip may further include at least one set of outwardly extending prongs. The sleeve may have opposed openings capable of engaging a first clip and a second clip between their respective plates.

18 Claims, 5 Drawing Sheets

SECTION A-A

FIG.5

SECTION B-B

SECTION A-A

BODY MOUNT

CROSS-REFERENCE TO RELATED APPLICATIONS

This application claims benefit from U.S. Provisional Patent Application No. 61/062,589, entitled "Body Mount," filed on Jan. 28, 2008, which is hereby incorporated in its entirety by reference.

FIELD OF THE INVENTION

The present invention is generally related to fasteners and, more particularly, to body mounts utilized in mounting a vehicle body to a vehicle frame or chassis.

BACKGROUND OF THE INVENTION

As is known in the art, vehicle bodies are commonly mounted on vehicle frames by the use of a plurality of body mounts. Each body mount typically includes a pair of upper and lower resilient blocks and a pair of upper and lower metal spacer members each having a generally planar flange portion and an integral elongated tubular portion. The resilient blocks are positioned on upper and lower sides of the vehicle frame in alignment with an opening in the frame, the tubular portions of the metal spacer members are respectively inserted in a central opening in a respective resilient block, and the inboard ends of tubular portions are secured together to respectively secure the resilient blocks to upper and lower sides of the vehicle frame. The vehicle body is then placed atop the upper resilient blocks and bolts are passed through respective openings in the vehicle body and threaded into respective body mounts to support the body on the frame.

Typically, the metal spacer members are complex with intricate features that allow them to be secured together and hold the resilient blocks in place until a bolt is passed through them. As such, these metal spacer members are typically manufactured through a costly deep extrusion process that not only gives the spacer members their general shape but also the aforementioned intricate securing and locking features.

Therefore, a need exists in the art for a simpler and less complicated body mount that is easier and more cost effective to produce. The body mount of the present invention is designed to provide simpler and more lightweight components thereby reducing complicated manufacturing processes.

DESCRIPTION OF THE DRAWINGS

Operation of the invention may be better understood by reference to the following detailed description taken in connection with the following illustrations, wherein.

SUMMARY OF THE INVENTION

A body mount that may include at least one clip, at least one plate and a sleeve. The clip may include a generally cylindrical body having a proximal end and a distal end. The clip may also include a central aperture therethrough from the proximal end to the distal end. The clip may further include a flange located at the distal end. The plate may have an aperture sized to receive the cylindrical body and engage the flange. The sleeve may have opposed openings capable of engaging a first clip and a second clip between their respective plates. The sleeve may be capable of receiving the cylindrical body of both the first clip and the second clip through the opposed openings.

DETAILED DESCRIPTION

While the invention is described herein with reference to several embodiments, it should be clear that the invention should not be limited only to the embodiments disclosed or discussed. The description of the embodiments herein is illustrative of the invention and should not limit the scope of the invention as described or claimed.

Figure 10:
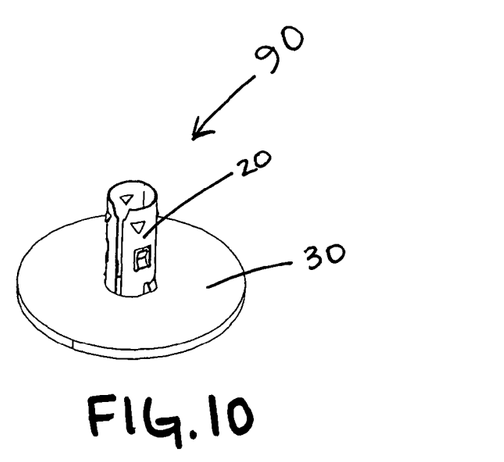
FIG. 10 illustrates a perspective view of a clip-and-plate subassembly of an embodiment of the body mount.
Figure 11:
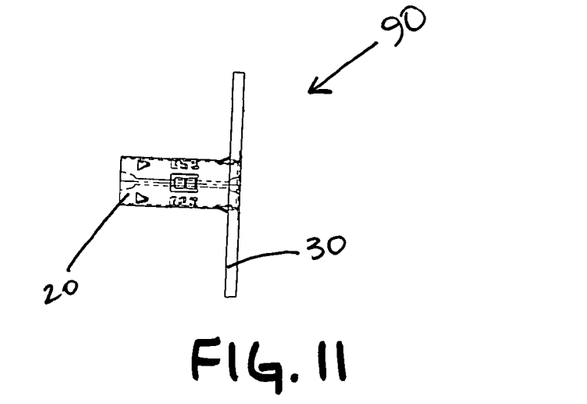
FIG. 11 illustrates a side view of the subassembly of FIG. 10.
Figure 12:
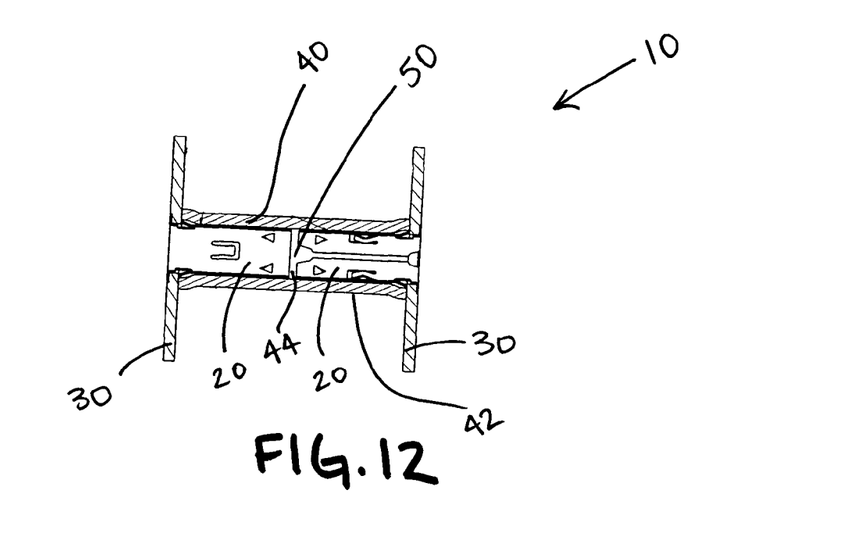
FIG. 12 illustrates an embodiment of the body mount.
Figure 13:
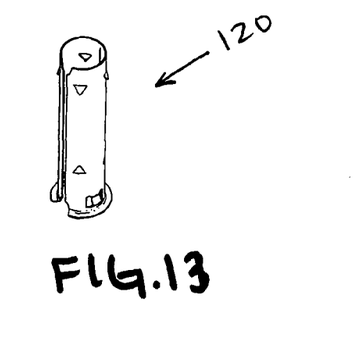
FIG. 13 illustrates a perspective view of a clip of another embodiment of the body mount.
Figure 14:
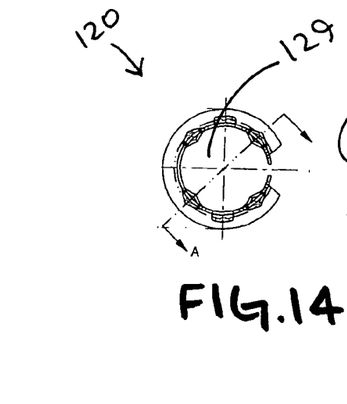
FIG. 14 illustrates a top view of the clip of FIG. 13.

As generally described herein, the present invention provides a body mount 10. Referring now to FIGS. 2-12, a first embodiment of a body mount 10 is shown. The body mount 10 may include two clip-plate subassemblies 90 connected and held together by a sleeve 40. Each clip-plate subassembly 90 may include a clip 20 and a plate 30. Thus, the body mount 10 may require two clips 20 and two plates 30 to be fully assembled with the sleeve 40, as shown in FIG. 12. When assembled, the clips 20 may be located adjacent to one another. The pair of clips 20 are preferably the same, however, it is to be understood that they may be the same or different clips.

Since the clips 20 are similar, the following description of the clip 20 will be understood to apply to both clips 20 needed for the body mount 10. The clip 20 may include a distal end 23 and a proximal end 25. It is to be understood that the clip 20 may be of any appropriate size, diameter and length, but is preferably of a circular shape. The body mount 10 may also include two plates 30, where each plate 30 may be disposed about the distal end 23 of the corresponding clip 20. The body mount 10 may further include a sleeve 40 that may be disposed about the clips 120 and located between the plates 30.

With reference to FIGS. 2-6, each clip 20 may have a generally tubular body 22 with a central aperture 29 located through the body 22 from the distal end 23 to the proximal end 25. The distal end 23 of the clip 20 may include a flange 24. The clips 20 may include a first set of prongs 26 located adjacent to the flange 24. The first set of prongs 26 may be of any appropriate size or shape, but are preferably of a generally rectangular shape. The first set of prongs 26 may project outwardly relative to the tubular body 22 and may be angled towards the flange 24. It will be appreciated, however, that the prongs 26 may be positioned at any appropriate angle. The flange 24 and the first set of prongs 26 may be operable to secure the plate 30 located therebetween, as shown in FIGS. 10-12.

With further reference to FIGS. 2-6, the clips 20 may also include a set of intermediate prongs 27. The intermediate set of prongs 27 may be of any appropriate size or shape, but are also preferably of a generally rectangular shape. The intermediate prongs 27 may project inward relative to the tubular body 22 and into the central aperture 29. The intermediate prongs 27 may be operable to engage the threads of a fastener (not shown), such as a bolt, screw or the like. The clips 20 may hold the fastener within the central aperture 29 until the fastener is later secured and tightened via a corresponding fastener (not shown), such as a nut or the like.

With additional reference to FIGS. 2-6, the clips 20 may further include a third set of prongs 28. The third set of prongs 28 may be of any appropriate size or shape, but are preferably of a generally triangular shape. The third set of prongs 28 may be formed on the tubular body 22 and may be located between the intermediate prongs 27 and the proximal end 25 of the clip 20. The third set of prongs 28 may project outwardly relative to the tubular body 22 and may be angled towards the flange 24. It will be appreciated, however, that the third set of prongs 28 may be positioned at any suitable angle. The third set of prongs 28 may be operable to engage the interior of the sleeve 40 and may lockingly secure the sleeve 40 about the clips 20. While the present embodiment illustrates each set of prongs 26, 27, 28 comprising between two and four prongs each, it will be appreciated that any suitable and appropriate number of prongs per set may be employed.

Figure 1:
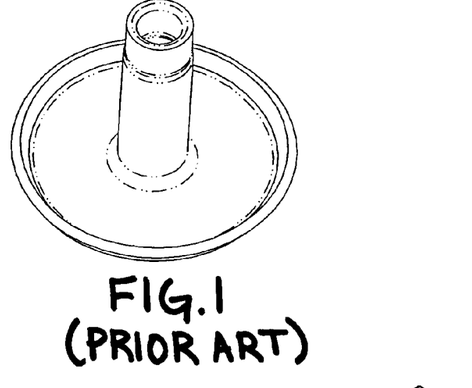
FIG. 1 illustrates a perspective view of a prior art body mount.
Figure 2:
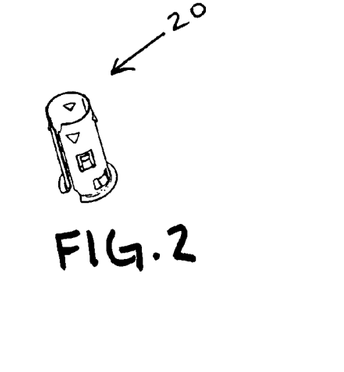
FIG. 2 illustrates a perspective view of a clip of an embodiment of a body mount.
Figure 3:
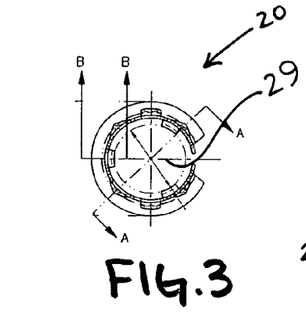
FIG. 3 illustrates a top view of the clip of FIG. 2.
Figure 4:
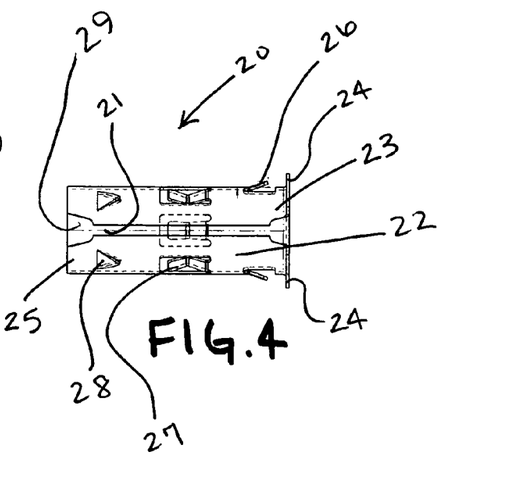
FIG. 4 illustrates a side view of the clip of FIG. 2.
Figure 5:
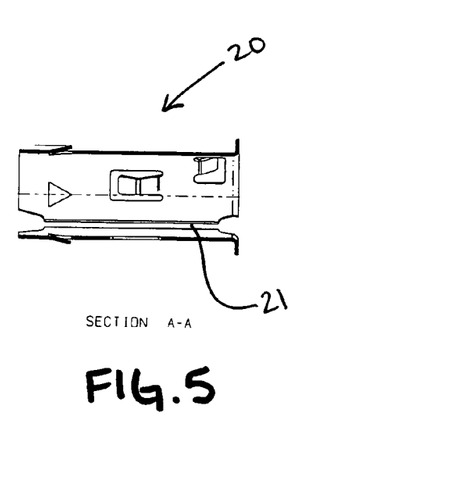
FIG. 5 illustrates a section view taken along line A-A of FIG. 3.
Figure 6:
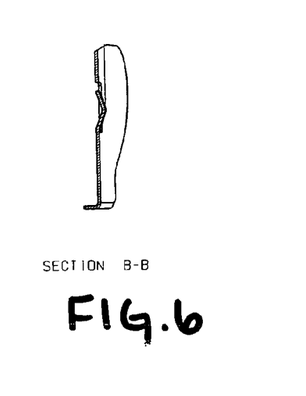
FIG. 6 illustrates a section view taken along line B-B of FIG. 3.

The clips 20 may also include a longitudinal split 21, as shown in FIGS. 4 and 5. The longitudinal split 21 may simplify manufacturing by relaxing the tolerances of the diameter of the clips 20 while also allowing the clips 20 to flex as it is being inserted into the sleeve 40 and/or flex while receiving a fastener. The clips 20 may be formed from any durable and resilient sheet material, such as a metal, a polymer, or a composite. However, it will be appreciated that the clips 20 may be formed from any appropriate and suitable material and by any suitable process, including but not limited to stamping, drawing, pressing, extruding, molding, etc.

Figure 7:
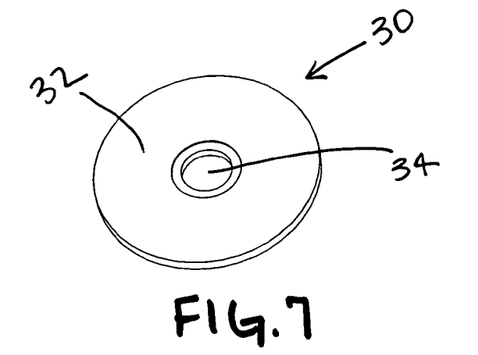
FIG. 7 illustrates a perspective view of a plate of an embodiment of the body mount.
Figure 8:
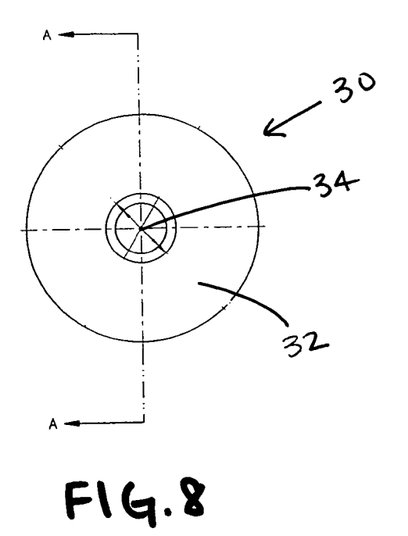
FIG. 8 a top view of the clip of FIG. 7.
Figure 9:
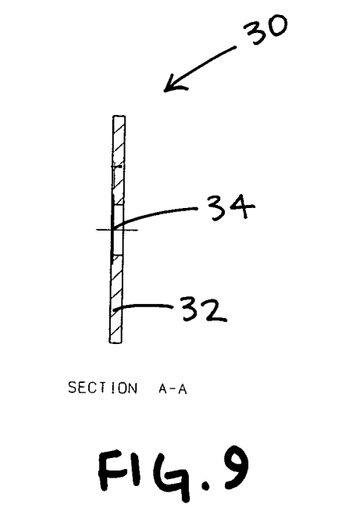
FIG. 9 illustrates a section view taken along line A-A of FIG. 8.

As illustrated in FIGS. 7-9, each plate 30 may include a body 32 and a central aperture 34. The central aperture 34 may be sized to coaxially receive the tubular body 22 of a clip 20, yet may also be small enough that the first set of prongs 26 may be capable of securing the plate 30 between the prongs 26 and flange 24 of the clip 20 whereby the plate 30 may not be permitted to slide back down the tubular body 22 after the plate 30 has passed the first set of prongs 26. The plate 30 may be constructed from any suitable material, including but not limited to metal, polymer, composite, etc.

As shown in FIG. 12, the sleeve 40 may be of a generally tubular body 42 having a central opening 44. The ends of the sleeve 40 may be flared, such as at 46, to accommodate the first set of prongs 26 on each clip 20. The sleeve 40 may also be constructed from any suitable material, including but not limited to metal, polymer, composite, etc.

The body mount 10 may typically be used in cooperation with a pair of resilient blocks (not shown) and a fastener (not shown), such as a bolt or the like, to secure a vehicle body (not shown) to a vehicle frame (not shown). For example, to utilize the body mount 10 in such a manner, a clip 20 and plate 30 subassembly may be assembled as follows, each of which will hereinafter be referred to as a "clip-and-plate subassembly" 90, as shown in FIGS. 10 and 11.

The body mount 10 preferably includes two clip-and-plate subassemblies 90. The proximal end 25 of a clip 20 may be introduced to an aperture 34 of a corresponding plate 30. The plate 30 may be slid from the proximal end 25 of the clip 20 towards the distal end 23 thereof. As the plate 30 passes the third set of prongs 28, the third set of prongs 28 may be squeezed inwardly thereby allowing the plate 30 to pass. Thereafter, once the plate 30 has cleared the third set of prongs 28, the third set of prongs 28 may spring outwardly to substantially return to their original position. Likewise, as the plate 30 passes the first set of prongs 26, the first set of prongs 26 may be squeezed inwardly thereby allowing the plate 30 to pass. Thereafter, once the plate 30 has cleared the first set of prongs 26, the first set of prongs 26 may spring outwardly to substantially return to their original position and to lockingly secure the plate 30 between the first set of prongs 26 and the flange 24.

Next, a sleeve 40 may be coaxially disposed about the tubular body 22 of the first clip-and-plate subassembly 90 by introducing the proximal end 25 of the clip 20 to the central opening 44 of the sleeve 40 and coaxially sliding the sleeve 40 from the proximal end 25 of the clip 20 towards the distal end 23 of the clip 20. The third set of prongs 28 may engage the interior of the sleeve 40 and permit the sleeve 40 to slide towards the distal end 23 of the clip 20, but, at the same time, prohibit the sleeve 40 from sliding back towards the proximal end 25 of the clip 20. The sleeve 40 may also further bias the plate 30 against the flange 24 of the clip 20. The clip-and-plate subassembly with the sleeve 40 disposed about the tubular body 22 of the clip 20 will hereinafter be referred to as the "clip-plate-sleeve subassembly" (not shown).

An upper resilient block (not shown), having an aperture (not shown), may then be placed atop an upper face of a vehicle frame (not shown) where the aperture of the upper resilient block may be in coaxial alignment with an opening in the vehicle frame. The aforementioned clip-plate-sleeve subassembly may then be passed through the aperture of the upper resilient block and opening in the vehicle frame such that the plate 30 rests atop the upper resilient block and the clip 20 and sleeve 40 project downwardly through the aperture of the upper resilient block and frame opening.

A lower resilient block (not shown), having an aperture (not shown), may then placed against the underface of the vehicle frame (not shown) such that the aperture of the lower resilient block is in coaxial alignment with the opening in the frame. A second clip-and-plate subassembly 90 may then be passed through the aperture of the lower resilient block and opening in the vehicle frame such that the plate 30 of the second clip-and-plate subassembly 90 may rest against the outer face of the lower resilient block, and the tubular body 22 of the clip 20 may project upwardly through the aperture of the lower resilient block and frame opening. The clip 20 of the second clip-and-plate subassembly 90 may be inserted into the opening 44 of the sleeve 40 of the clip-plate-sleeve subassembly such that the third set of prongs 28 of the second clip 20 may engage the interior of the sleeve 40, thereby securing the second clip-plate subassembly 90 to the clip-plate-sleeve subassembly so as to complete the assembly of the body mount 10. The upper and lower resilient blocks are thus secured to the vehicle frame by the body mount 10.

A body of a vehicle (not shown) may then be placed atop the upper resilient block such that an aperture in the vehicle body may be in coaxial alignment with the aperture 50 of the body mount 10, where the aperture 50 of the body mount 10 is defined by the coaxially aligned apertures 29 of the respective clips 20. A fastener (not shown), such as a bolt or the like, may then be passed through the aperture 50 of the body mount 10 whereby the respective intermediate prongs 27 of the clips 20 hold the fastener in position until the fastener is later secured and tightened via another corresponding fastener (not shown), such as a nut or the like.

Figure 17:
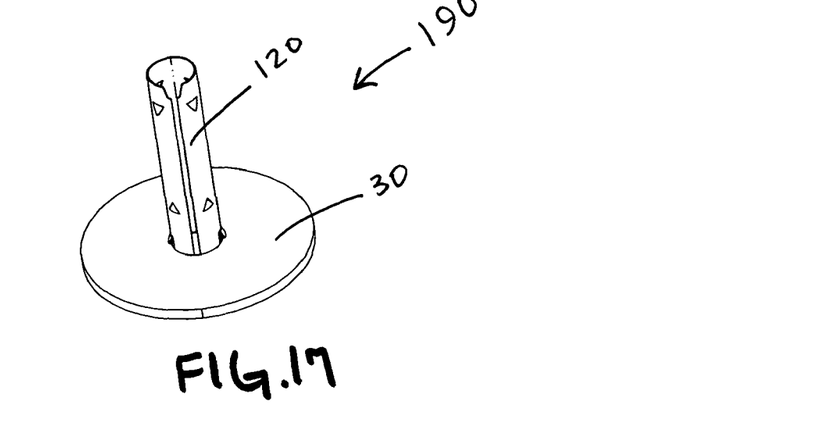
FIG. 17 illustrates a perspective view of another clip-and-plate subassembly of another embodiment of the body mount.
Figure 18:
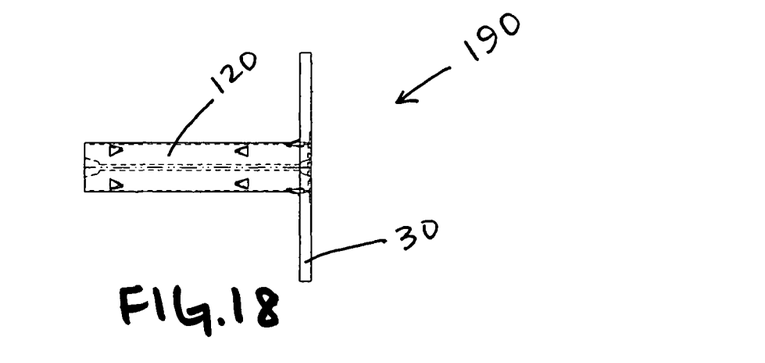
FIG. 18 illustrates a side view of the subassembly of FIG. 17.
Figure 19:
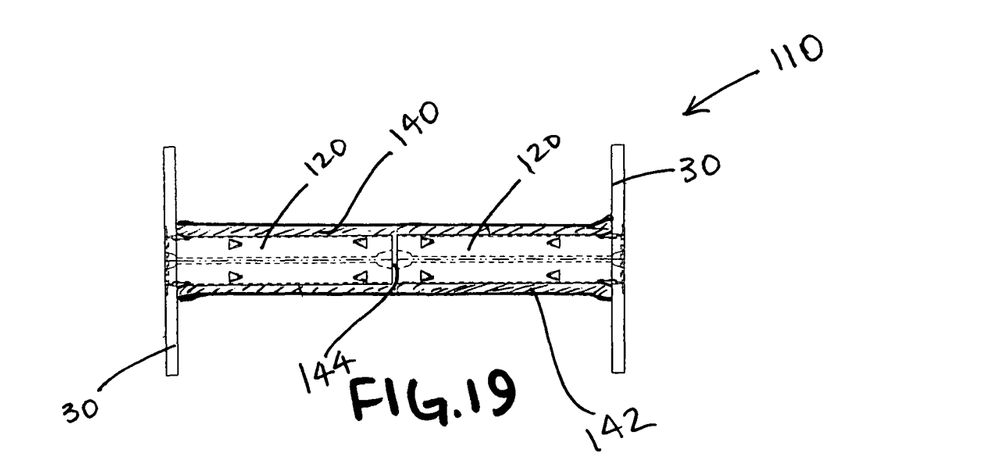
FIG. 19 illustrates another embodiment of the body mount.

Referring now to FIGS. 7-9 and 13-19, an alternative embodiment of a body mount 110 is shown. The body mount 110 may include two clip-plate subassemblies 190 connected and held together by a sleeve 140. Each clip-plate subassembly 190 may include a clip 120 and a plate 30. Thus, the body mount 110 may require two clips 120 and two plates 30 to be fully assembled with the sleeve 140, as shown in FIG. 19. When assembled, the clips 120 may be located adjacent to one another. The pair of clips 120 are preferably the same, however, it is to be understood that they may be the same or different clips.

Since the clips 120 are similar, the following description of the clip 20 will be understood to apply to both clips 120 needed for the body mount 110. With reference to FIGS. 13-16, the clip 120 may include a distal end 123 and a proximal end 125. It is to be understood that the clip 120 may be of any appropriate size, diameter and length, but is preferably of a circular shape. The body mount 110 may also include two plates 30, where each plate 30 may be disposed about the distal end 123 of the corresponding clip 120. The body mount 110 may further include a sleeve 140 that may be disposed about the clips 120 and located between the plates 30.

As shown in FIGS. 13-16, each clip 120 may have a generally tubular body 122 with a central aperture 129 located through the body 122 from the distal end 123 to the proximal end 125. The distal end 123 of the clip 120 may include a flange 124. The clips 120 may include a first set of prongs 126 located adjacent to the flange 124. The first set of prongs 126 may be of any appropriate size or shape, but are preferably of a generally rectangular shape. The first set of prongs 126 may project outwardly relative to the tubular body 122 and may be angled towards the flange 124. It will be appreciated, however, that the prongs 126 may be positioned at any appropriate angle. The flange 124 and the first set of prongs 126 may be operable to secure a plate 30 located therebetween.

With reference to FIGS. 13-16, the clips 120 may also include a set of intermediate prongs 127. The intermediate set of prongs 127 may be of any appropriate size or shape, but are preferably of a generally triangular shape. The intermediate prongs 27 may project inward relative to the tubular body 122 and into the central aperture 129. The intermediate prongs 127 may be operable to engage the threads of a fastener (not shown), such as a bolt, screw or the like. The clips 120 may hold the fastener within the central aperture 129 until the fastener is later secured and tightened via a corresponding fastener (not shown), such as a nut or the like.

With further reference to FIGS. 13-16, the clips 120 may further include a third set of prongs 128. The third set of prongs 128 may be of any appropriate size or shape, but are also preferably of a generally triangular shape. The third set of prongs 128 may be formed on the tubular body 122 and may be located between the intermediate prongs 127 and the proximal end 125 of the clip 120. The third set of prongs 128 may project outwardly relative to the tubular body 122 and may be angled towards the flange 124. It will be appreciated, however, that the third set of prongs 128 may be positioned at any suitable angle. The third set of prongs 128 may be operable to engage the interior of the sleeve 140 and may lockingly secure the sleeve 140 about the clips 120. While the present embodiment illustrates each set of prongs 126, 127, 128 comprising between two and four prongs each, it will be appreciated that any suitable and appropriate number of prongs per set may be employed.

Figure 15:
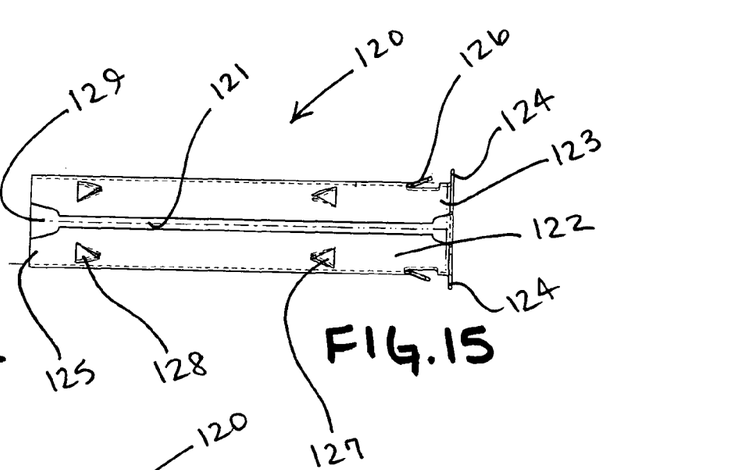
FIG. 15 illustrates a side view of the clip of FIG. 14.
Figure 16:
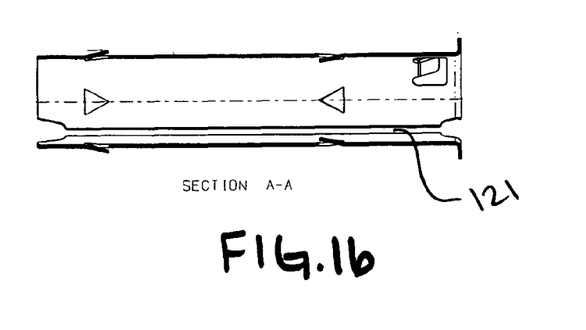
FIG. 16 illustrates a section view taken along line A-A of FIG. 14.

The clips 120 may also include a longitudinal split 121, as shown in FIGS. 15 and 16. The longitudinal split 121 may simplify manufacturing by relaxing the tolerances of the diameter of the clips 120 while also allowing the clips 120 to flex as it is being inserted into the sleeve 140 and/or flex while receiving a fastener. The clips 120 may be formed from any durable and resilient sheet material, such as a metal, a polymer, or a composite. However, it will be appreciated that the clips 120 may be formed from any appropriate and suitable material and by any suitable process, including but not limited to stamping, drawing, pressing, extruding, molding, etc.

As discussed above, each plate 30 may include a body 32 and a central aperture 34, as illustrated in FIGS. 7-9. The central aperture 34 may be sized to coaxially receive the tubular body 122 of a clip 120, yet may also be small enough that the first set of prongs 126 may be capable of securing the plate 30 between the prongs 126 and flange 124 of the clip 120 whereby the plate 30 may not be permitted to slide back down the tubular body 122 after the plate 30 has passed the first set of prongs 126. The plate 30 may be constructed from any suitable material, including but not limited to metal, polymer, composite, etc.

As shown in FIG. 19, the sleeve 140 may be of a generally tubular body 142 having a central opening 144. The ends of the sleeve 140 may be flared, such as at 146, to accommodate the first set of prongs 126 on each clip 120. The sleeve 140 may also be constructed from any suitable material, including but not limited to metal, polymer, composite, etc.

As also discussed above, the body mount 110 may typically be used in cooperation with a pair of resilient blocks (not shown) and a fastener (not shown), such as a bolt or the like, to secure a vehicle body (not shown) to a vehicle frame (not shown). For example, to utilize the body mount 110 in such a manner, a clip 120 and plate 30 subassembly may be assembled as follows, each of which will hereinafter be referred to as a "clip-and-plate subassembly" 190, as illustrated in FIGS. 17 and 18.

The body mount 110 preferably includes two clip-and-plate subassemblies 190. The proximal end 125 of a clip 120 may be introduced to an aperture 34 of a corresponding plate 30. The plate 30 may be slid from the proximal end 125 of the clip 120 towards the distal end 123 thereof. As the plate 30 passes the third set of prongs 128, the third set of prongs 128 may be squeezed inwardly thereby allowing the plate 30 to pass. Thereafter, once the plate 30 has cleared the third set of prongs 128, the third set of prongs 128 may spring outwardly to substantially return to their original position. Likewise, as the plate 30 passes the first set of prongs 126, the first set of prongs 126 may be squeezed inwardly thereby allowing the plate 30 to pass. Thereafter, once the plate 30 has cleared the first set of prongs 126, the first set of prongs 126 may spring outwardly to substantially return to their original position and to lockingly secure the plate 30 between the first set of prongs 126 and the flange 124.

Next, a sleeve 140 may be coaxially disposed about the tubular body 122 of the first clip-and-plate subassembly 190 by introducing the proximal end 125 of the clip 120 to the central opening 144 of the sleeve 140 and coaxially sliding the sleeve 140 from the proximal end 125 of the clip 120 towards the distal end 123 of the clip 120. The third set of prongs 128 may engage the interior of the sleeve 140 and permit the sleeve 140 to slide towards the distal end 123 of the clip 120, but, at the same time, prohibit the sleeve 40 from sliding back towards the proximal end 125 of the clip 120. The sleeve 140 may also further bias the plate 30 against the flange 124 of the clip 120. The clip-and-plate subassembly with the sleeve 140 disposed about the tubular body 122 of the clip 120 will hereinafter be referred to as the "clip-plate-sleeve subassembly" (not shown).

An upper resilient block (not shown), having an aperture (not shown), may then be placed atop an upper face of a vehicle frame (not shown) where the aperture of the upper resilient block may be in coaxial alignment with an opening in the vehicle frame. The aforementioned clip-plate-sleeve subassembly may then be passed through the aperture of the upper resilient block and opening in the vehicle frame such that the plate 30 rests atop the upper resilient block and the clip 120 and sleeve 140 project downwardly through the aperture of the upper resilient block and frame opening.

A lower resilient block (not shown), having an aperture (not shown), may then placed against the underface of the vehicle frame (not shown) such that the aperture of the lower resilient block is in coaxial alignment with the opening in the frame. A second clip-and-plate subassembly 190 may then be passed through the aperture of the lower resilient block and opening in the vehicle frame such that the plate 30 of the second clip-and-plate subassembly 190 may rest against the outer face of the lower resilient block, and the tubular body 122 of the clip 120 may project upwardly through the aperture of the lower resilient block and frame opening. The clip 120 of the second clip-and-plate subassembly 190 may be inserted into the opening 144 of the sleeve 140 of the clip-plate-sleeve subassembly such that the third set of prongs 128 of the second clip 120 may engage the interior of the sleeve 140, thereby securing the second clip-plate subassembly 190 to the clip-plate-sleeve subassembly so as to complete the assembly of the body mount 110. The upper and lower resilient blocks are thus secured to the vehicle frame by the body mount 110.

A body of a vehicle (not shown) may then be placed atop the upper resilient block such that an aperture in the vehicle body may be in coaxial alignment with the aperture 150 of the body mount 110, where the aperture 150 of the body mount 110 is defined by the coaxially aligned apertures 129 of the respective clips 120. A fastener (not shown), such as a bolt or the like, may then be passed through the aperture 150 of the body mount 110 whereby the respective intermediate prongs 127 of the clips 120 hold the fastener in position until the fastener is later secured and tightened via another corresponding fastener (not shown), such as a nut or the like.

The embodiments of the invention have been described above and, obviously, modifications and alternations will occur to others upon reading and understanding this specification. The claims as follows are intended to include all modifications and alterations insofar as they come within the scope of the claims or the equivalent thereof.

Having thus described the invention, we claim:

1. A body mount assembly comprising:
   at least one clip comprising:
      a generally cylindrical body having a proximal end and a distal end and a central aperture therethrough from the proximal end to the distal end; and
      a flange located at the distal end;
   at least one plate having an aperture sized to receive the cylindrical body and engage the flange; and
   a sleeve having opposed openings capable of engaging a first clip and a second clip between their respective plates, wherein said sleeve is capable of receiving the cylindrical body of both the first clip and the second clip through the opposed openings.

2. The body mount assembly of claim 1 wherein said body further comprises a longitudinal split located along said body between the proximal end and the distal end.

3. The body mount assembly of claim 2 wherein said body further includes at least one set of inwardly extending prongs capable of engaging a fastener inserted within the central aperture.

4. The body mount assembly of claim 3 wherein said body includes at least one set of outwardly extending prongs capable of engaging the sleeve when the body is inserted therein.

5. A body mount assembly comprising:
   a first clip comprising:
      a generally cylindrical body having a proximal end and a distal end and a central aperture through the body from the proximal end to the distal end; and
      a flange located at the distal end;
   a second clip comprising:
      a generally cylindrical body having a proximal end and a distal end and a central aperture through the body from the proximal end to the distal end; and
      a flange located at the distal end;
   a first plate having an aperture sized to receive the cylindrical body of the first clip and engage the flange of the first clip;
   a second plate having an aperture sized to receive the cylindrical body of the second clip and engage the flange of the second clip; and
   a sleeve having opposed openings capable of engaging the first clip and the second clip between the first plate and the second plate, wherein the sleeve is capable of receiving the cylindrical body of the first clip and the second clip through the opposed openings.

6. The body mount assembly of claim 5 wherein the body of the first clip further comprises a longitudinal split located along the body between the proximal end and the distal end.

7. The body mount assembly of claim 5 wherein the body of the second clip further comprises a longitudinal split located along the body between the proximal end and the distal end.

8. The body mount assembly of claim 6 wherein the body of the first clip further includes at least one set of inwardly extending prongs capable of engaging a fastener inserted within the central aperture.

9. The body mount assembly of claim 7 wherein the body of the second clip further includes at least one set of inwardly extending prongs capable of engaging a fastener inserted within the central aperture.

10. The body mount assembly of claim 5 wherein the body of the first clip includes at least one set of outwardly extending prongs capable of engaging the sleeve when the body of the first clip is inserted therein.

11. The body mount assembly of claim 10 wherein the body of the second clip includes at least one set of outwardly extending prongs capable of engaging the sleeve when the body of the second clip is inserted therein.

12. A body mount assembly comprising:
   a first clip comprising:
      a generally cylindrical body having a proximal end and a distal end;
      a flange located at the distal end; and
      at least one set of outwardly extending prongs;
   a second clip comprising:

a generally cylindrical body having a proximal end and a distal end; and
a flange located at the distal end;
a first plate having an aperture sized to receive the cylindrical body and engage the flange of the first plate;
a second plate having an aperture sized to receive the cylindrical body and engage the flange of the second plate; and
a sleeve having opposed openings capable of engaging the first clip and the second clip between the first plate and the second plate, wherein the sleeve is capable of receiving the cylindrical body of the first clip and the second clip through the opposed openings and wherein the at least one set of outwardly extending prongs engage the sleeve when the first clip is inserted therein.

13. The body mount assembly of claim 12 wherein the body of the first clip further comprises a longitudinal split located along the body of the first clip between the proximal end and the distal end.

14. The body mount assembly of claim 12 wherein the body of the first clip further includes a central aperture through the body from the proximal end to the distal end.

15. The body mount assembly of claim 14 wherein the body of the first clip includes at least one set of inwardly extending prongs capable of engaging a fastener inserted within the central aperture of the first clip.

16. The body mount assembly of claim 12 wherein the body of the second clip further includes a central aperture through the body from the proximal end to the distal end.

17. The body mount assembly of claim 16 wherein the body of the second clip includes at least one set of inwardly extending prongs capable of engaging a fastener inserted within the central aperture of the second clip.

18. The body mount assembly of claim 12 wherein the body of the second clip further includes at least one set of outwardly extending prongs capable of engaging the sleeve when the body of the second clip is inserted therein.

\* \* \* \* \*